United States Patent
Jia et al.

(10) Patent No.: US 11,987,507 B2
(45) Date of Patent: May 21, 2024

(54) UV/O₃/H₂O₂ ADVANCED OXIDATION REACTOR AND PROCESS

(71) Applicant: SHANDONG WATER & WASTEWATER MONITORING CENTER, Shandong (CN)

(72) Inventors: Ruibao Jia, Shandong (CN); Wuchang Song, Shandong (CN); Hao Jiao, Shandong (CN); Shaohua Sun, Shandong (CN); Hongbo Wang, Shandong (CN); Guifang Li, Shandong (CN)

(73) Assignee: SHANDONG WATER & WASTEWATER MONITORING CENTER, Shandong (CN)

( * ) Notice: Subject to any disclaimer, the term of this patent is extended or adjusted under 35 U.S.C. 154(b) by 271 days.

(21) Appl. No.: 16/975,142

(22) PCT Filed: Apr. 25, 2019

(86) PCT No.: PCT/CN2019/084310
§ 371 (c)(1),
(2) Date: Aug. 24, 2020

(87) PCT Pub. No.: WO2020/007102
PCT Pub. Date: Jan. 9, 2020

(65) Prior Publication Data
US 2021/0078875 A1   Mar. 18, 2021

(30) Foreign Application Priority Data
Jul. 5, 2018 (CN) .......................... 201810729486.0

(51) Int. Cl.
*C02F 1/32* (2006.01)
*C02F 9/00* (2023.01)
(Continued)

(52) U.S. Cl.
CPC ................ *C02F 1/325* (2013.01); *C02F 9/00* (2013.01); *C02F 1/722* (2013.01); *C02F 1/78* (2013.01);
(Continued)

(58) Field of Classification Search
CPC ...... C02F 1/32; C02F 1/78; C02F 1/46; C02F 9/00; C02F 1/72
See application file for complete search history.

(56) References Cited

FOREIGN PATENT DOCUMENTS

| CN | 101423283 | 5/2009 |
|---|---|---|
| CN | 204824256 | 12/2015 |

(Continued)

OTHER PUBLICATIONS

Zhang CN 207276380 U; Waste Water Advanced Oxidation System Includes Circulation Tank, Buffer Tank, Controller, Oxidation Reaction Groove, Liquid Inlet, Liquid Outlet, Discharging Hole, Emptying Water Discharging Valve, Liquid Level Meter And Overflow Port (Year: 2018).*

(Continued)

*Primary Examiner* — Walter D. Griffin
*Assistant Examiner* — Cameron J Allen
(74) *Attorney, Agent, or Firm* — JCIP Global Inc.

(57) ABSTRACT

A UV/O₃/H₂O₂ advanced oxidation reactor includes a water inlet pipe, a water outlet pipe, an ultraviolet reactor, an H₂O₂ adding device and an O₃ adding device. The ultraviolet reactor has a plurality of ultraviolet lamps embedded therein, and the ultraviolet lamps are arranged at an angle with respect to partition plates. The water inlet pipe is connected to a water inlet in a lower portion of the ultraviolet reactor, and the water outlet pipe is connected to a water outlet in an upper portion of the ultraviolet reactor. The H₂O₂ adding device and the O₃ adding device are arranged on a connecting pipe of the water inlet pipe. After raw water is pressur- (Continued)

ized, $H_2O_2$ is added into the raw water through the $H_2O_2$ adding device, then ozone is added in the raw water through a water injector, and finally the raw water enters the ultraviolet reactor.

2 Claims, 3 Drawing Sheets

(51) Int. Cl.
    *C02F 1/72*     (2023.01)
    *C02F 1/78*     (2023.01)

(52) U.S. Cl.
    CPC ............... *C02F 2201/3227* (2013.01); *C02F 2305/023* (2013.01)

(56) References Cited

FOREIGN PATENT DOCUMENTS

| | | |
|---|---|---|
| CN | 106064861 | 11/2016 |
| CN | 106219844 | 12/2016 |
| CN | 207276380 | 4/2018 |
| CN | 108585329 | 9/2018 |
| JP | 2006110522 | 4/2006 |

OTHER PUBLICATIONS

Zhou CN 105858993 A Device For Processing Waste Water Containing Alcohol, Comprises Closed Hollow Housing Where Bottom End Of Housing Is Provided With Two Water Inlets; And One Of Water Inlet Is Connected With Raw Water Source Inlet Pipe (Year: 2016).*

"International Search Report (Form PCT/ISA/210) of PCT/CN2019/084310," dated Jun. 18, 2019, pp. 1-5.

* cited by examiner

UV/O$_3$/H$_2$O$_2$ ADVANCED OXIDATION REACTOR AND PROCESS

CROSS-REFERENCE TO RELATED APPLICATION

This application is a 371 of international application of PCT application serial no. PCT/CN2019/084310, filed on Apr. 25, 2019, which claims the priority benefit of China application no. 201810729486.0, filed on Jul. 5, 2018. The entirety of each of the above mentioned patent applications is hereby incorporated by reference herein and made a part of this specification.

BACKGROUND

Technical Field

The invention relates to a reaction system capable of realizing UV/O$_3$/H$_2$O$_2$ advanced oxidation, and belongs to the technical field of feed water treatment.

Description of Related Art

With the development of social economy and gradual improvement of the living standard, people have put forward higher and higher requirements for water quality. Traditional water treatment processes are mainly used to remove suspended matter, colloid and bacteria in water, but cannot remove dissolved organic matter in water. Advanced oxidation processes (AOPs), as an advanced treatment technology for drinking water, have received more and more attention. UV/O$_3$, O$_3$/H$_2$O$_2$ and UV/H$_2$O$_2$ advanced oxidation processes can generate high-oxidizability hydroxyl radicals (.OH) to rapidly and completely oxidize organic pollutants, thus being able to effectively remove persistent trace pollutants in water such as odorous substances, disinfection by-products, pesticide residues and endocrine disrupters, having the advantages of high oxidizability, high treatment efficiency, no selectivity, no generation of secondary pollution, and the like, and exhibiting a broad application prospect and a great development potential. Exiting UV/O$_3$, O$_3$/H$_2$O$_2$ or UV/H$_2$O$_2$ advanced oxidation systems are generally independent systems, and a composite system capable of realizing UV/O$_3$, O$_3$/H$_2$O$_2$ and UV/H$_2$O$_2$ advanced oxidation is barely available. Ozone oxidation is typically carried out in an ozone contact tank which requires a hydraulic retention time not less than 15 min and a water depth of about 7 m; however, the ozone utilization rate is low, and bromates may be generated. There is no relating technique or study in design of ultraviolet reactors and layout of ultraviolet lamp tubes. Existing common ultraviolet reactors are typically cylindrical and have a short hydraulic retention time. The ultraviolet dose is the product of the ultraviolet intensity and the exposure time of water in ultraviolet. As for continuous-flow UV reactors having a constant hydraulic condition, the dose of ultraviolet received by pollutants passing through the reaction region mainly depends on the ultraviolet intensity. Therefore, reasonable design of the ultraviolet reactors is of significant importance for improving the ultraviolet radiation efficiency.

SUMMARY

The technical issue to be settled by the invention is to overcome the drawbacks of the prior art by providing a novel advanced oxidation reaction system capable of realizing UV/O$_3$, O$_3$/H$_2$O$_2$ and UV/H$_2$O$_2$ advanced oxidation synchronously.

To settle the above technical issue, the invention provides a UV/O$_3$/H$_2$O$_2$ advanced oxidation reactor comprising a water inlet pipe, a water outlet pipe, an ultraviolet reactor, an H$_2$O$_2$ adding device and an O$_3$ adding device. The ultraviolet reactor is of a bottom-inlet top-outlet curvet structure and has a plurality of ultraviolet lamps embedded therein, and the ultraviolet lamps are arranged at an angle with respect to partition plates. The water inlet pipe is connected to a water inlet in a lower portion of the ultraviolet reactor, the water outlet pipe is connected to a water outlet in an upper portion of the ultraviolet reactor, and the H$_2$O$_2$ adding device and the O$_3$ adding device are arranged on a connecting pipe of the water inlet pipe. The O$_3$ adding device comprises a gas source, an ozone generator and a water injector. The H$_2$O$_2$ adding device comprises an H$_2$O$_2$ storage tank, a metering pump and a static mixer. After raw water is pressurized, H$_2$O$_2$ with a certain concentration is added to the raw water through the H$_2$O$_2$ adding device, then ozone with a certain concentration generated by the ozone generator is added to the raw water through the water injector, and finally the raw water enters the ultraviolet reactor.

The ultraviolet reactor comprises a cavity and ultraviolet lamps. Each of the ultraviolet lamps consists of a plurality of ultraviolet lamp tubes which are installed at an angle of 15°-30°, and a distance between the lamp tubes meets d=(1/1-UVT) cm. A length-width-height ratio of the cavity is 3:2:1, and 45° baffle plates are arranged at inner corners of the cavity, and the baffle plates arranged at the opposite corners of the cavity are parallel to the ultraviolet lamp tubes. The partition plates used for fixing the ultraviolet lamp tubes are arranged in the cavity.

Ultraviolet lamp bushings are arranged on the ultraviolet lamp tubes, and a number of the ultraviolet lamp tubes depends on power of the ultraviolet lamps, the ultraviolet intensity, the exposure time and the UV dose in to-be-treated water.

The H$_2$O$_2$ adding device comprises a storage tank, a metering pump and a static mixer.

The invention further provides a UV/O$_3$/H$_2$O$_2$ advanced oxidation process which has following process parameters.

An H$_2$O$_2$ dose is 0.5-5 mg/L.

An O$_3$ dose is controlled to 0.5-1 mg/L.

A hydraulic retention time is not greater than 5 min, and the flow rate is not greater than 0.15 m/s.

A UV dose is 200-300 mJ/cm2.

When all devices are started, following reaction is carried out in the reactor.

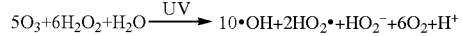

$$5O_3 + 6H_2O_2 + H_2O \xrightarrow{UV} 10 \cdot OH + 2HO_2 \cdot + HO_2^- + 6O_2 + H^+$$

The invention has the following beneficial effects: UV/O$_3$, O$_3$/H$_2$O$_2$ and UV/H$_2$O$_2$ advanced oxidation can be carried out independently or synchronously, and the high oxidizability of .OH is fully used, so that the oxidation efficiency is improved, and generation of bromates is avoided; the layout of the ultraviolet lamp tubes and the structure of the reactor are optimized, the ultraviolet radiation effect is brought into full play, and the UV utilization rate is increased; the hydraulic retention time of the reactor is shortened, little space is occupied, and a channel form can be adopted to realize better process cohesion, secondary lifting of the ozone contact tank is avoided, and operation is more economical; and the UV dose, the $H_2O_2$ dose, the $O_3$ dose can be independently controlled and measured, and the process can be carried out more flexibly.

DESCRIPTION OF THE EMBODIMENTS

The invention is specifically described below in combination with the accompanying drawings and embodiments.

Figure 1:
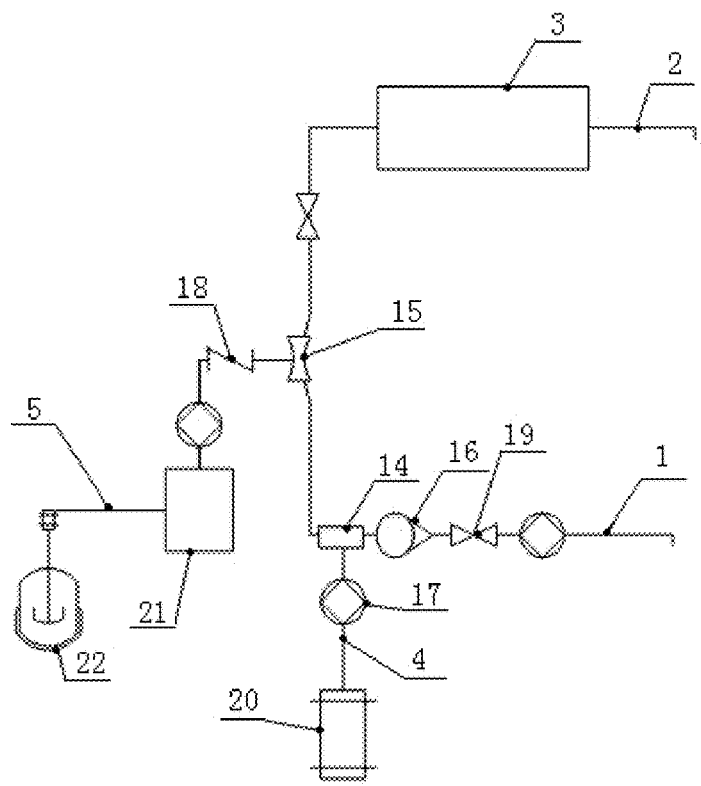
FIG. 1 is a process flow diagram of the invention.

FIG. 1 is a process flow diagram of the invention.

The invention provides a $UV/O_3/H_2O_2$ advanced oxidation reactor comprising a water inlet pipe 1, a water outlet pipe 2, an ultraviolet reactor 3, an $H_2O_2$ adding device 4, and an $O_3$ adding device 5.

The ultraviolet reactor 3 is of a bottom-inlet top-outlet curvet structure and has a plurality of ultraviolet lamps 6 embedded therein, and the ultraviolet lamps 6 are arranged at an angle with respect to partition plates 10. The hydraulic retention time is not greater than 5 min, the flow rate is not greater than 0.15 m/s, and the UV dose is 200-300 mJ/cm$^2$.

The water inlet pipe 1 is connected to a water inlet 12 in a lower portion of the ultraviolet reactor, the water outlet pipe 2 is connected to a water outlet 13 in an upper portion of the ultraviolet reactor, and the $H_2O_2$ adding device 4 and the $O_3$ adding device 5 are arranged on a connecting pipe of the water inlet pipe 1.

The $H_2O_2$ adding device comprises a storage tank, a metering pump and a static mixer, and the $H_2O_2$ dose is 0.5-5 mg/L.

The $O_3$ adding device comprises a liquid oxygen tank 22, an ozone generator 21 and a water injector 15. The liquid oxygen in the liquid oxygen tank is depressurized by a depressurization valve of the liquid oxygen tank and then enters the ozone generator, and ozone generated by the ozone generator is finally added into a system through the water injector after the output dose of the ozone is regulated by an air pump, and is prevented by a check valve from flowing back. The $O_3$ dose is controlled to 0.5-1 mg/L.

Raw water is pressurized by a pump and then enters the advanced oxidation system with the flow rate regulated by a gate valve 19 and a flowmeter 16. $H_2O_2$ with a certain concentration is added to the raw water through the $H_2O_2$ adding device 4, and then the ozone with a certain concentration generated by the ozone generator is added to the raw water through the water injector, and finally the raw water enters the ultraviolet reactor.

Figure 2:
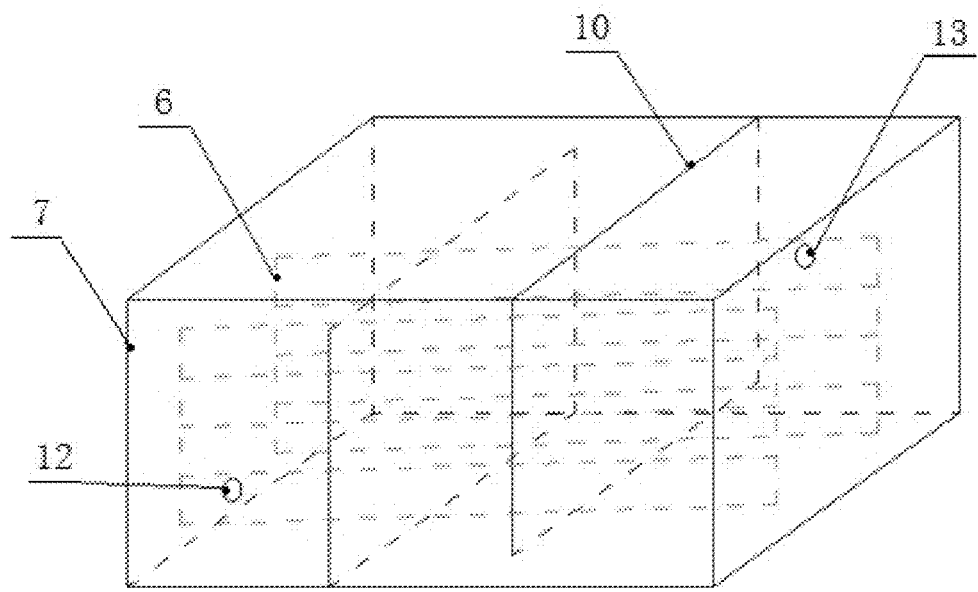
FIG. 2 is a perspective view of an ultraviolet reactor of the invention.

FIG. 2 is a perspective view of the ultraviolet reactor of the invention.

Figure 3:
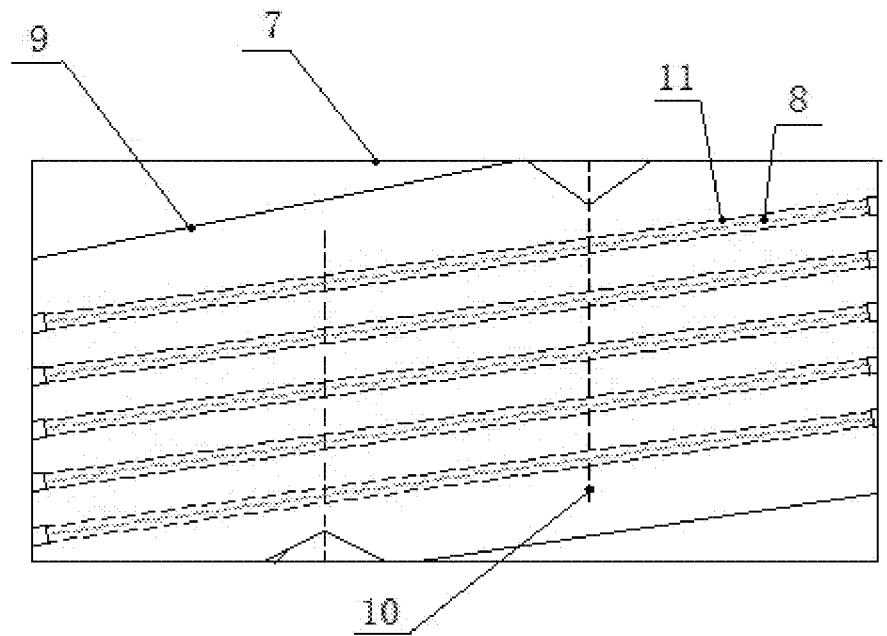
FIG. 3 is a front view of the ultraviolet reactor of the invention.
Figure 4:
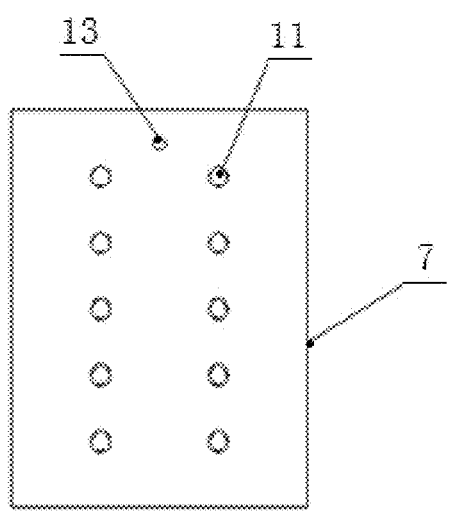
FIG. 4 is a left view of the ultraviolet reactor of the invention.
Figure 5:
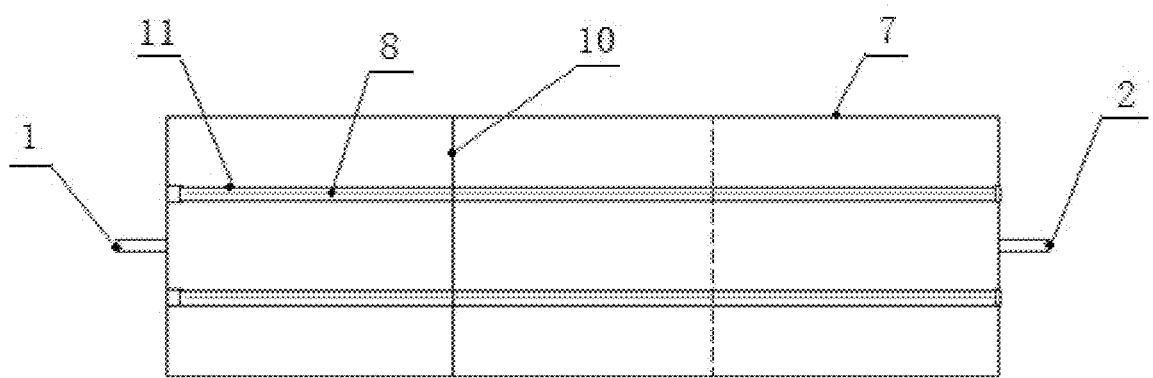
FIG. 5 is a top view of the ultraviolet reactor of the invention.

FIG. 3-FIG. 5 are a front view, a left view and a top view of the ultraviolet reactor of the invention.

The ultraviolet reactor 3 comprises a cavity 7 and ultraviolet lamps 6.

Each of the ultraviolet lamp 6 consists of a plurality of ultraviolet lamp tubes 8 which are installed at an angle of 15°-30°, and a distance d between the lamp tubes meets d=(1/1-UVT) cm.

Ultraviolet lamp bushings 11 are arranged on the ultraviolet lamp tubes 8, and a number of the ultraviolet lamp tubes 8 depends on power of the ultraviolet lamps, the ultraviolet intensity, the exposure time and the UV dose in to-be-treated water.

A length-width-height ratio of the cavity 7 is 3:2:1, and 45° baffle plates are arranged at inner corners of the cavity 7, so that stagnant water regions and low-intensity regions are reduced, and the advanced oxidation efficiency is improved. The baffle plates 9 arranged at the opposite corners of the cavity 7 are parallel to the ultraviolet lamp tubes 8, and a length of the baffle plates 9 depends on the dimensions of the reactor.

The partition plates 10 used for fixing the ultraviolet lamp tubes 8 are arranged in the cavity 7.

The ultraviolet transmittance is the ratio of non-absorbed ultraviolet to total output ultraviolet after ultraviolet with a wavelength of 254 nm passes through a to-be-treated water sample in a 1 cm cuvette, and can be obtained by measurement and calculation through spectrophotometer.

Operating principle of the invention is as follows.

The invention can realize $UV/O_3$, $O_3/H_2O_2$ and $UV/H_2O_2$ advanced oxidation. As for the $UV/O_3$ process, the following reactions are carried out in the reactor:

$$\tfrac{1}{3}O_3 + H_2O \rightarrow H_2O_2$$

$$H_2O_2 \rightarrow 2\cdot OH$$

As for the $O_3/H_2O_2$ process, the following reactions are carried out in the reactor:

$$O_3 + OH^- \rightarrow HO_2^- + O_2$$

$$H_2O_2 + H_2O \rightarrow HO_2^- + H_3O^+$$

$$O_3 + HO_2^- \rightarrow \cdot OH + O_2^- + O_2$$

$$O_3 + \cdot OH \rightarrow HO_2 \cdot + O_2$$

$$O_3 + O_2^- \rightarrow O_3^- + O_2$$

$$O_3^- + H_2O \rightarrow \cdot OH + O_2 + OH^-$$

As for the $UV/H_2O_2$ process, the following reactions are carried out in the reactor:

$$H_2O_2 \rightarrow 2OH\cdot$$

$$H_2O_2 \rightarrow HO_2\cdot + H\cdot$$

$$H_2O_2 + OH\cdot \rightarrow HO_2\cdot + H_2O$$

$$H_2O_2 + H\cdot \rightarrow OH\cdot + H_2O$$

$$HO_2\cdot + H_2O_2 \rightarrow OH\cdot + H_2O + O_2$$

The above reactions can be carried out independently or synchronously by starting or stopping corresponding devices; and when all the devices are started, the following reaction is carried out in the reactor:

$$5O_3 + 6H_2O_2 + H_2O \xrightarrow{UV} 10\cdot OH + 2HO_2\cdot + HO_2^- + 6O_2 + H^+$$

According to the invention, $UV/O_3$, $O_3/H_2O_2$ and $UV/H_2O_2$ advanced oxidation can be carried out independently or synchronously, and the high oxidizability of .OH is fully used, so that the oxidation efficiency is improved, and generation of bromates is avoided. The layout of the ultraviolet lamp tubes and the structure of the reactor are optimized, the ultraviolet radiation effect is brought into full play, and the UV utilization rate is increased. The hydraulic retention time of the reactor is shortened, little space is occupied, and a channel form can be adopted to realize better process cohesion, secondary lifting of the ozone contact tank is avoided, and operation is more economical. The UV dose, the $H_2O_2$ dose and the $O_3$ dose can be independently controlled and measured, and the process can be carried out more flexibly.

The above embodiments are only illustrative ones, and are not all possible ones of the invention. All transformations made within the scope of the invention or its equivalents should also be included in the invention.

What is claimed is:

1. A UV/$O_3$/$H_2O_2$ advanced oxidation reactor, comprising a water inlet pipe, a water outlet pipe, an ultraviolet reactor and an $H_2O_2$ adding device, wherein the water inlet pipe is connected to a water inlet in a lower portion of the ultraviolet reactor, the water outlet pipe is connected to a water outlet in an upper portion of the ultraviolet reactor, and the $H_2O_2$ adding device is arranged on a connecting pipe of the water inlet pipe; an $O_3$ adding device is arranged on the connecting pipe of the water inlet pipe; the $O_3$ adding device comprises a gas source, an ozone generator and a water injector; the $H_2O_2$ adding device comprises a $H_2O_2$ storage tank, a metering pump and a static mixer; the $H_2O_2$ adding device is disposed to add $H_2O_2$ with a certain concentration to pressurized raw water, the water injector is disposed to add ozone with a certain concentration generated by the ozone generator to the raw water which enters the ultraviolet reactor; and the ultraviolet reactor is configured as a structure that has a bottom end provided with an inlet and a top end provided with an outlet, and that has a plurality of ultraviolet lamps embedded therein, and the ultraviolet lamps are arranged at an angle with respect to a plurality of partition plates, wherein the ultraviolet reactor comprises an ultraviolet reactor cavity and the ultraviolet lamps, each of the ultraviolet lamps consists of a plurality of ultraviolet lamp tubes which are installed at an angle of 15°-30°, and a distance between the ultraviolet lamp tubes is a reciprocal of a difference between a light transmittance of pure water and a light transmittance of a water sample; a length-width-height ratio of the ultraviolet reactor cavity is 3:2:1, 45° baffle plates are arranged at inner corners of the ultraviolet reactor cavity, and the baffle plates arranged at the opposite corners of the cavity are parallel to the ultraviolet lamp tubes; and the partition plates used for fixing the ultraviolet lamp tubes are arranged in the cavity.

2. The UV/$O_3$/$H_2O_2$ advanced oxidation reactor according to claim 1, wherein a plurality of ultraviolet lamp bushings are respectively arranged on the ultraviolet lamp tubes, and a number of the ultraviolet lamp tubes depends on power of the ultraviolet lamps, an ultraviolet intensity, an exposure time and a UV dose in to-be-treated water.

* * * * *